United States Patent
Cho et al.

(10) Patent No.: US 7,742,116 B2
(45) Date of Patent: Jun. 22, 2010

(54) DISPLAY PANEL AND METHOD OF MANUFACTURING THE SAME

(75) Inventors: Young-Je Cho, Cheonan-si (KR);
Yun-Seok Lee, Cheonan-si (KR);
Cheon-Jae Maeng, Suwon-si (KR);
Byung-Hyun Kim, Asan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 11/869,866

(22) Filed: Oct. 10, 2007

(65) Prior Publication Data

US 2008/0088788 A1 Apr. 17, 2008

(30) Foreign Application Priority Data

Oct. 12, 2006 (KR) .................... 10-2006-0099408

(51) Int. Cl.
*G02F 1/1343* (2006.01)
(52) U.S. Cl. .......................... 349/39; 349/38; 349/106; 349/138; 349/48; 349/129
(58) Field of Classification Search .................. 349/38, 349/39
See application file for complete search history.

(56) References Cited

U.S. PATENT DOCUMENTS

| | | | |
|---|---|---|---|
| 5,748,266 A * | 5/1998 | Kodate ...................... | 349/39 |
| 6,057,896 A | 5/2000 | Rho et al. | |
| 6,724,447 B2 | 4/2004 | Kim | |
| 7,430,023 B2 * | 9/2008 | Chang ........................ | 349/43 |
| 2002/0003519 A1 | 1/2002 | Kim | |
| 2006/0103800 A1 * | 5/2006 | Li et al. ...................... | 349/129 |

FOREIGN PATENT DOCUMENTS

| | | |
|---|---|---|
| JP | 2001-059960 | 3/2001 |
| KR | 10-2005-000684 | 1/2005 |
| KR | 10-2006-068035 | 6/2006 |

\* cited by examiner

*Primary Examiner*—Richard H Kim
(74) *Attorney, Agent, or Firm*—H.C. Park & Associates, PLC

(57) ABSTRACT

A display panel and a method of manufacturing the same in which a storage electrode is formed on a first base substrate, and an insulating layer is formed on the first base substrate to cover the storage electrode. The insulating layer is recessed directly above the storage electrode. A pixel electrode faces the storage electrode and is formed on the insulating layer. A protruding portion is formed on a second base substrate facing the first base substrate. The protruding portion protrudes toward a concaved portion of the insulating layer.

21 Claims, 11 Drawing Sheets

DISPLAY PANEL AND METHOD OF MANUFACTURING THE SAME

CROSS-REFERENCE TO RELATED APPLICATION

This application claims priority from and the benefit of Korean Patent Application No. 2006-99408, filed on Oct. 12, 2006, which is hereby incorporated by reference for all purposes as if fully set forth herein.

BACKGROUND OF INVENTION

1. Field of the Invention

The present invention relates to a display panel and a method of manufacturing the same. More particularly, the present invention relates to a display panel having a reduced manufacturing cost and a method of manufacturing the display panel.

2. Discussion of the Background

Generally, a liquid crystal display includes an array substrate, a color filter substrate facing the array substrate, and a liquid crystal layer interposed between the array substrate and the color filter substrate.

The array substrate includes a plurality of pixels to display an image therethrough. Each pixel includes a gate line, a data line, a thin film transistor, a storage line, and a pixel electrode. The gate and data lines receive gate and data signals, respectively, and are coupled to gate and source electrodes of the thin film transistor, respectively. The pixel electrode is coupled to a drain electrode of the thin film transistor.

The color filter substrate includes a color filter layer and a common electrode. The color filter layer includes red, green, and blue color filters. The common electrode is arranged on the color filter layer and faces the pixel electrode with the liquid crystal layer being interposed between the common electrode and the pixel electrode.

The array substrate may be manufactured through a process using five masks or a process using four masks. In the five mask process, an active layer and an ohmic contact layer of the thin film transistor are patterned using a different mask from that used to pattern the transistor's source and drain electrodes. However, in the four mask process, the active layer, the ohmic contact layer, and the source and drain electrodes of the thin film transistor are sequentially patterned using only one mask. As a result, the four mask process is simpler than the five mask process.

The array substrate completed through the process using four masks includes a storage capacitor that is defined by a storage electrode, a pixel electrode, and an insulating layer interposed between the storage electrode and the pixel electrode as the capacitor's dielectric. In order to increase the storage capacitor's capacitance, the insulating layer may be partially recessed toward the storage electrode. However, when the insulating layer is recessed, an amount of liquid crystal filled in the recessed portion of the insulating layer increases.

SUMMARY OF THE INVENTION

The present invention provides a display panel having a uniform cell gap and a reduced manufacturing cost.

The present invention also provides a method suitable for manufacturing the above display panel.

Additional features of the invention will be set forth in the description which follows, and in part will be apparent from the description, or may be learned by practice of the invention.

The present invention discloses a display panel that includes an array substrate, an opposite substrate facing the array substrate, and a liquid crystal interposed between the array substrate and the opposite substrate. The array substrate includes a first base substrate having a plurality of pixel areas, a storage electrode, an insulating layer, and a pixel electrode. The storage electrode is arranged in each pixel area of the first base substrate. The insulating layer covers the storage electrode and has a concave portion directly above the storage electrode. The pixel electrode is arranged on the insulating layer and faces the storage electrode. The opposite substrate includes a second base substrate, which faces the first base substrate, and a protruding portion. The protruding portion is arranged on the second base substrate at a position corresponding to the storage electrode and it protrudes toward the first base substrate.

The present invention also discloses a method of manufacturing a display panel. According to the method, a gate electrode and a storage electrode are formed in a pixel area of a first base substrate, and an insulating layer is formed on the first base substrate to cover the gate electrode and the storage electrode. An active pattern, an ohmic contact pattern, a source electrode, and a drain electrode are formed on the gate insulating layer. The source electrode and the drain electrode have the same shape as that of the ohmic contact pattern. An insulating layer is formed to cover the source electrode and the drain electrode, and the insulating layer includes a concave portion directly above the storage electrode. A pixel electrode is formed on the insulating layer. A protruding portion is formed on a second base substrate. The first base substrate and the second base substrates are coupled together such that the first base substrate faces the second base substrate with the protruding portion protruding toward the storage electrode. A liquid crystal layer is formed between the first and second base substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIGS. 8A, 8B, 8C, 8D, 8E, 8F, 8G, 8H, 8I, 8J, and 8K are cross-sectional views showing a process of manufacturing the

DETAILED DESCRIPTION OF THE ILLUSTRATED EMBODIMENTS

Exemplary embodiments of the invention are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to", or "directly coupled to" another element or layer, there are no intervening elements or layers present. As used herein, the term "and/or" includes any and all combinations of one or more of the listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
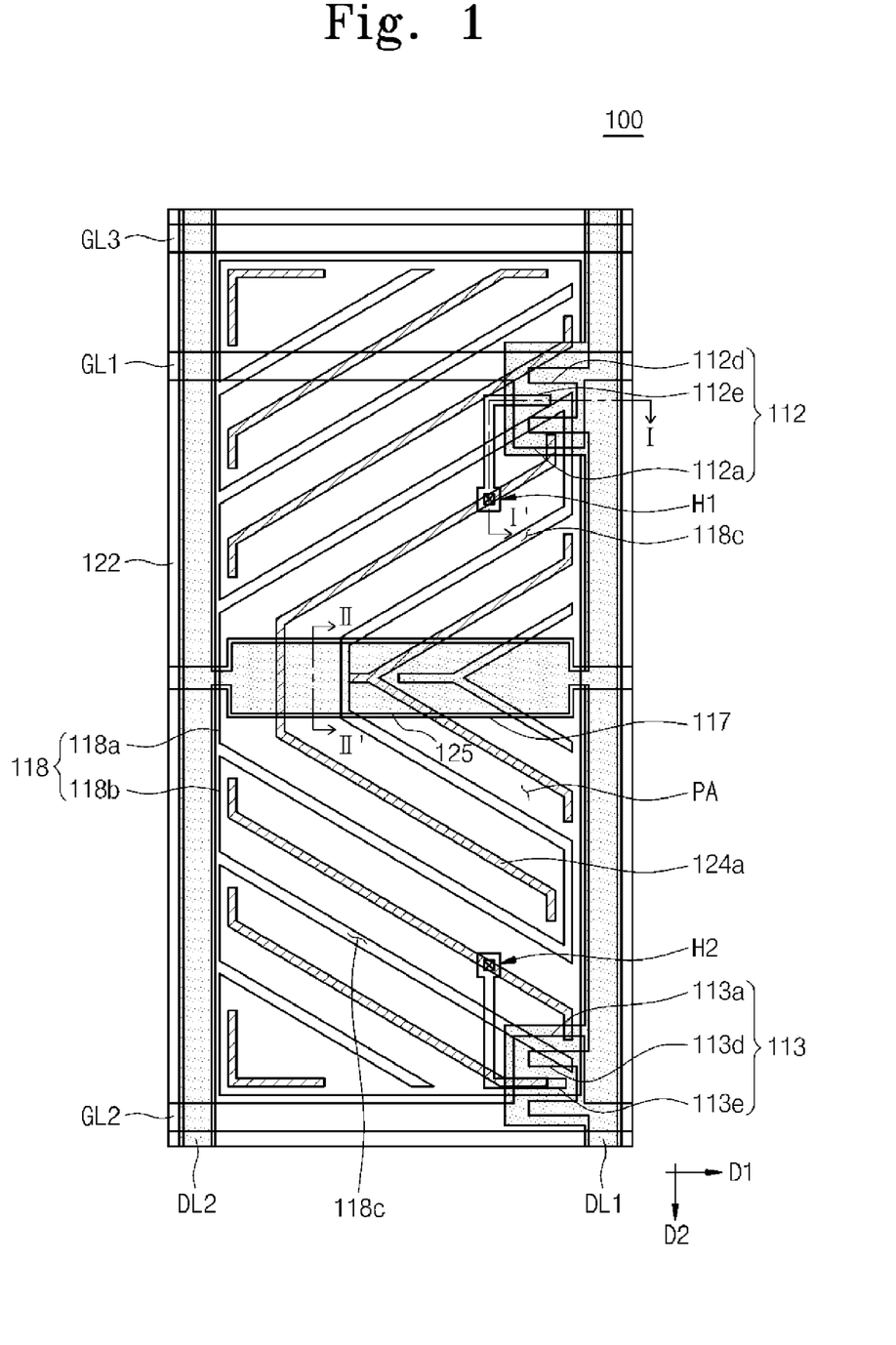
FIG. 1 is a plan view showing a display panel according to an exemplary embodiment of the present invention.
Figure 2:
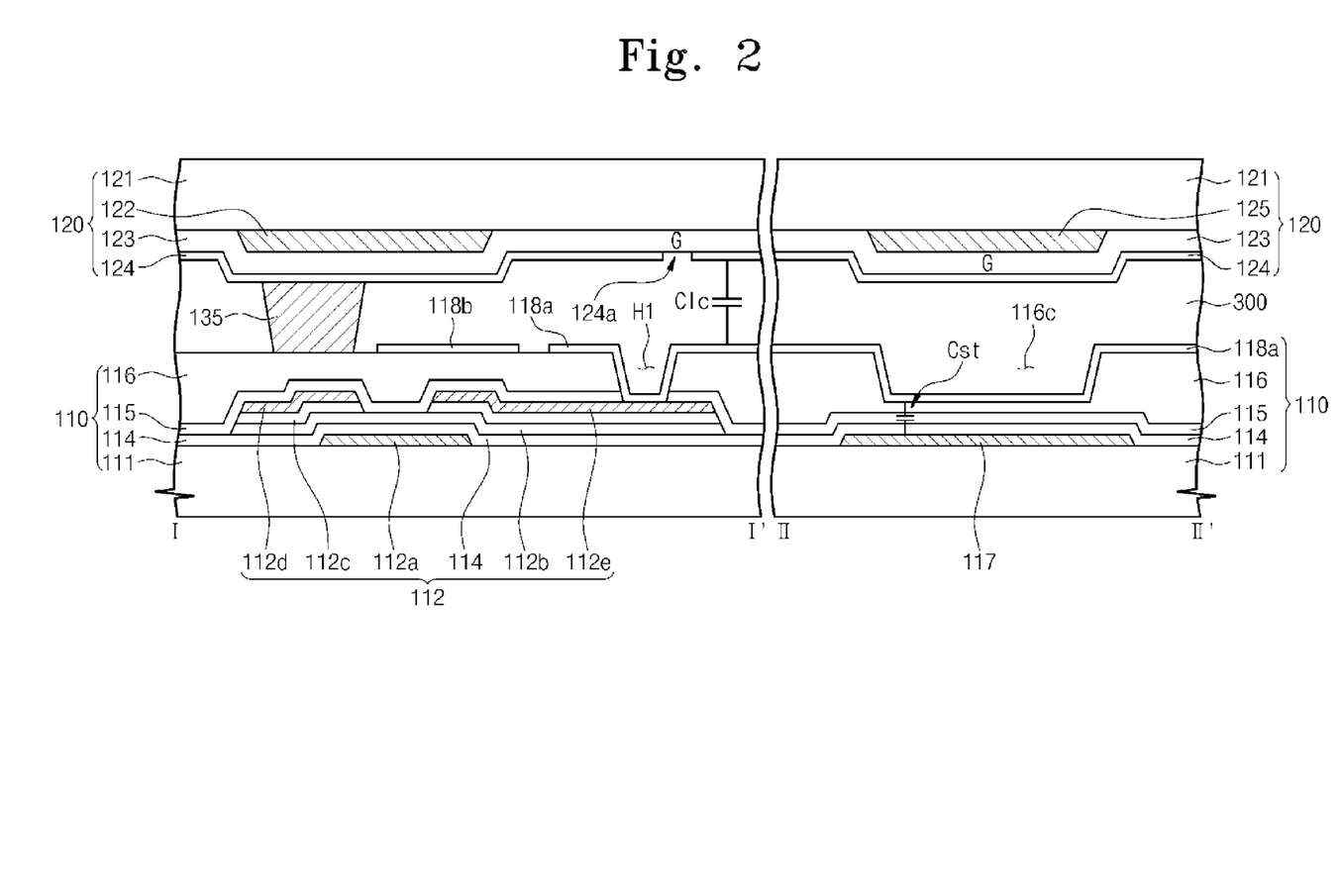
FIG. 2 is a cross-sectional view taken along lines I-I' and II-II' of FIG. 1.

FIG. 1 is a plan view showing a display panel according to an exemplary embodiment of the present invention. FIG. 2 is a cross-sectional view taken along lines I-I' and II-II' of FIG. 1.

Referring to FIG. 1 and FIG. 2, a display panel 100 includes an array substrate 110, a color filter substrate 120 facing the array substrate 110, and a liquid crystal layer 300 interposed between the array substrate 110 and the color filter substrate 120.

The array substrate 110 includes a first base substrate 111 and a plurality of pixels. A plurality of pixel areas is defined on the first base substrate 111 in a matrix configuration, and the pixels are arranged in the pixel areas, respectively. In the present exemplary embodiment, since the pixels have same structure and function, only one pixel among the pixels will be illustrated with reference to FIG. 1 and FIG. 2, and detailed descriptions of the remaining pixels will be omitted.

A first data line DL1, a first gate line GL1, and a second gate line GL2 are arranged on the first base substrate 111 and electrically coupled to the pixel. A third gate line GL3 and a second data line DL2 are further arranged on the first base substrate 111 and are electrically coupled to adjacent pixels.

The first, second, and third gate lines GL1, GL2, and GL3 extend in a first direction D1, and the first and second data lines DL1 and DL2 extend in a second direction D2, which is substantially perpendicular to the first direction D1. The second and third gate lines GL2 and GL3 and the first and second data lines DL1 and DL2 define the rectangular-shaped pixel area PA on the first base substrate 111. The first and second data lines DL1 and DL2 are arranged on a different layer than the first, second, and third gate lines GL1, GL2, and GL3, so that the first and second data lines DL1 and DL2 may be electrically insulated from the first, second, and third gate lines GL1, GL2, and GL3.

The pixel arranged in the pixel area PA includes a first thin film transistor 112, a second thin film transistor 113, a gate insulating layer 114, a passivation layer 115, an organic insulating layer 116, a storage electrode 117, and a pixel electrode 118.

The first thin film transistor 112 includes a first gate electrode 112a, a first active pattern 112b, a first ohmic contact pattern 112c, a first source electrode 112d, and a first drain electrode 112e.

The first gate electrode 112a branches from the first gate line GL1 and is arranged on the first base substrate 111. The first gate electrode 112a is covered by the gate insulating layer 114. The first active pattern 112b and the first ohmic contact pattern 112c are sequentially formed on the gate insulating layer 114. The first ohmic contact pattern 112c is partially removed above the first gate electrode 112a. The first source electrode 112d and the first drain electrode 112e are formed on the ohmic contact pattern 112c and spaced apart from each other in the area where the first ohmic contact pattern 112c is partially removed.

The second thin film transistor 113 includes a second gate electrode 113a, a second active pattern (not shown), a second ohmic contact pattern (not shown), a second source electrode 113d, and a second drain electrode 113e.

FIG. 2 shows a cross-sectional view of the first thin film transistor 112. The second thin film transistor 113 has the same cross-sectional structure as the first thin film transistor 112.

The second gate electrode 113a of the second thin film transistor 113 branches from the second gate line GL2 and is arranged on the first base substrate 111. The second gate electrode 113a is covered by the gate insulating layer 114. The second active pattern and the second ohmic contact pattern are sequentially formed on the gate insulating layer 114, and the second ohmic contact pattern is partially removed above the second gate electrode 113a. The second source electrode 113d and the second drain electrode 113e are formed on the second ohmic contact pattern and spaced apart from each other in the area where the second ohmic contact pattern is partially removed.

The storage electrode 117 includes the same material as the first and second gate electrodes 112a and 113a, and it is formed between the first and second gate lines GL1 and GL2. The storage electrode 117 has a rectangular shape and extends in the first direction D1. The storage electrode 117 is covered by the gate insulating layer 114, which is arranged over the pixel area PA.

The passivation layer 115 covers the gate insulating layer 114 and the first and second thin film transistors 112 and 113. The organic insulating layer 116 is arranged on the passivation layer 115. The passivation layer 115 and the organic insulating layer 116 include first and second contact holes H1 and H2 exposing the first and second drain electrodes 112e and 113e, respectively. The organic insulating layer 116 is recessed directly above the storage electrode 117 in a predetermined depth. Thus, the organic insulating layer 116 includes a concave portion 116c that is defined directly above the storage electrode 117.

The pixel electrode 118 is arranged on the organic insulating layer 116. The pixel electrode 118 has a symmetrical shape in plan view with respect to the storage electrode 117, which is positioned at a central portion of the pixel area PA.

The pixel electrode 118 and the storage electrode 117 define a storage capacitor Cst together with the organic insulating layer 116, the passivation layer 115, and the gate insulating layer 114, which serve as the capacitor's dielectric substance. The organic insulating layer 116 may be completely or partially removed directly above the storage electrode 117. Therefore, a capacitance of the storage capacitor Cst may increase in proportion to the reduced thickness of the organic insulating layer 116.

The pixel electrode 118 includes a first sub pixel electrode 118a to receive a first pixel voltage and a second sub pixel electrode 118b to receive a second pixel voltage, which is smaller than the first pixel voltage. The first and second sub pixel electrodes 118a and 118b are electrically coupled to different thin film transistors to receive different pixel voltages.

The first sub pixel electrode 118a is electrically coupled to the first drain electrode 112e through the first contact hole H1, and the second sub pixel electrode 118b is electrically coupled to the second drain electrode 113e through the second contact hole H2. When the first thin film transistor 112 turns on in response to a first gate signal applied through the first gate line GL1, the first pixel voltage is supplied to the first sub pixel electrode 118a via the first thin film transistor 112 and the first data line DL1. Then, when the second thin film transistor 113 turns on in response to a second gate signal applied through the second gate line GL2, the second pixel voltage is supplied to the second sub pixel electrode 118b via the second thin film transistor 113 and the first data line DL1.

As the first and second sub pixel electrodes 118a and 118b receive different voltages from each other, the liquid crystals positioned over the first and second sub pixel electrodes 118a and 118b align in different directions from each other. As a result, light passing through the areas corresponding to the first and second sub pixel electrodes 118a and 118b has different characteristics, thereby improving display quality (e.g., a side viewing angle) of the display panel 100 through a mutual compensation between light characteristics.

As FIG. 1 shows, the first sub pixel electrode 118a may have a V-shape rotated in a clockwise direction and is partially overlapped with the storage electrode 117. The first sub pixel electrode 118a is symmetrically positioned relative to the storage electrode 117. The second sub pixel electrode 118b is arranged in the remaining pixel area PA.

The first and second sub pixel electrodes 118a and 118b are electrically insulated and spaced apart from each other by means of first opening patterns 118c. The first opening patterns 118c are formed through the second sub pixel electrode 118b and spaced apart from each other by a predetermined distance. The first opening patterns 118c divide the pixel area PA into a plurality of domains.

The color filter substrate 120 facing the array substrate 110 includes a second base substrate 121, a first black matrix 122, a color filter layer 123, a common electrode 124, a first protruding portion 125, and a column spacer 135.

The first black matrix 122 includes a light blocking material and is arranged on the second base substrate 121. As FIG. 1 shows, the first black matrix 122 is arranged directly above the first and second data lines DL1 and DL2 and the first and second thin film transistors 112 and 113. The first black matrix 122 prevents light from leaking through an area that is adjacent to the pixel area PA.

The color filter layer 123 includes red, green, and blue color filters, and the red, green, and blue color filters are arranged in areas corresponding to the pixel areas PA of the array substrate 110, respectively. FIG. 2 shows the green color filter G corresponding to one pixel area PA of the pixel areas PA.

The common electrode 124 is arranged on the color filter layer 123 with a uniform thickness. Plural second opening patterns 124a are formed through the common electrode 124 and spaced apart from each other by a predetermined distance. Each first opening pattern 118c in the pixel electrode 118 is disposed between two adjacent second opening patterns 124a. The first and second opening patterns 118c and 124a divide one pixel area PA into a plurality of domains (e.g., 18 domains).

The liquid crystal layer 300 is interposed between the array substrate 110 and the color filter substrate 120, and liquid crystal molecules of the liquid crystal layer 300 provided in different domains align in different directions from each other. Thus, a viewing angle of the display panel 100 may be improved.

The column spacer 135 is arranged on the common electrode 124 and interposed between the array substrate 110 and color filter substrate 120 to maintain a gap between the array substrate 110 and the color filter substrate 120. Thus, liquid crystals may be injected into the space defined between the array substrate 110 and the color filter substrate 120.

Although an image is not displayed on area where the storage electrode 117 is arranged because the storage electrode 117 blocks light, the liquid crystals are also injected in that area. The first protruding portion 125 is arranged on the second base substrate 121 to protrude toward the array substrate 110 to prevent excess liquid crystals from accumulating at the concave portion 116c.

In the present exemplary embodiment, the first protruding portion 125 includes a second black matrix, which is made of the same material as that of the first black matrix 122 and is substantially simultaneously patterned with the first black matrix 122 through the same process. As noted above, since the storage electrode 117 does not transmit light, an opening ratio of the display panel 100 does not decrease when the first protruding portion 125 is formed as the second black matrix directly above the storage electrode 117.

The height of the first protruding portion 125 is equal to or less than the depth of the concave portion 116c. The width of the first protruding portion 125 is equal to or less than the width of the storage electrode 117. In the present exemplary embodiment, the height of the first protruding portion 125 is substantially the same as the thickness of the first black matrix 122.

As the first protruding portion 125 is arranged at an area of the color filter substrate 120 corresponding to the storage electrode 117, a thickness of the liquid crystal layer 300 may be reduced in proportion to the height of the first protruding portion 125 at the concave portion 116c. Thus, the amount of the liquid crystals at the concave portion 116c may be decreased, thereby reducing a total amount of the liquid crystal.

The first protruding portion 125 uniformly maintains a cell-gap (i.e., a distance between the array substrate 110 and the color filter substrate 120) of the display panel 100. As the height of the first protruding portion 125 is controlled in proportion to the depth of the concave portion 116c, the cell-gap of the display panel 100 may be uniformly maintained, thereby improving the display quality of the display panel 100.

Figure 3:
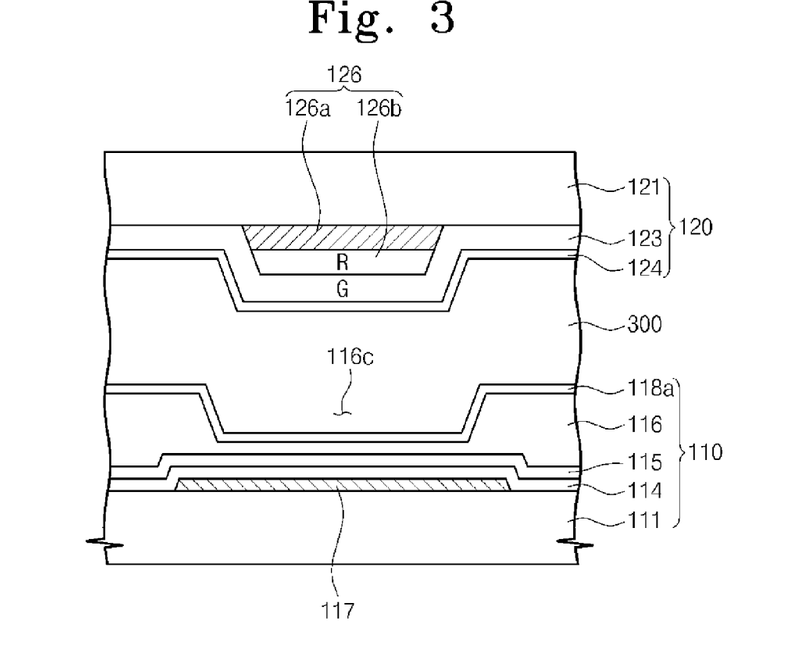
FIG. 3 is a cross-sectional view showing a storage electrode area of a display panel according to another exemplary embodiment of the present invention.

FIG. 3 is a cross-sectional view showing a storage electrode area of a display panel according to another exemplary embodiment of the present invention. In FIG. 3, the same reference numerals denote the same elements in FIG. 2, and thus detailed descriptions of the same elements will be omitted.

Referring to FIG. 3, a second protruding portion 126 arranged on the color filter substrate 120 at an area corresponding to the storage electrode 117 includes a second black matrix 126a and a dummy color filter 126b. A green color filter G is arranged on the color filter substrate 120 to cover the second protruding portion 126.

The second black matrix 126a includes the same material as that of the first black matrix 122 (shown in FIG. 2) and is substantially simultaneously patterned together with the first black matrix 122 through one process. The dummy color filter 126b has the same color as that of one color filter of color filters adjacent to the green color filter G and is substantially simultaneously patterned together with the one color filter through one process. In the present exemplary embodiment, the dummy color filter 126b is a red (R) color filter R.

When the second protruding portion 126 includes the dummy color filter 126b, the height of the second protruding portion 126 exceeds that of the first protruding portion 125 shown in FIG. 2. Therefore, the thickness of the liquid crystal layer 300 may be further reduced at the concave portion 116c, thereby reducing a total amount of the liquid crystal injected into the display panel 100.

Figure 4:
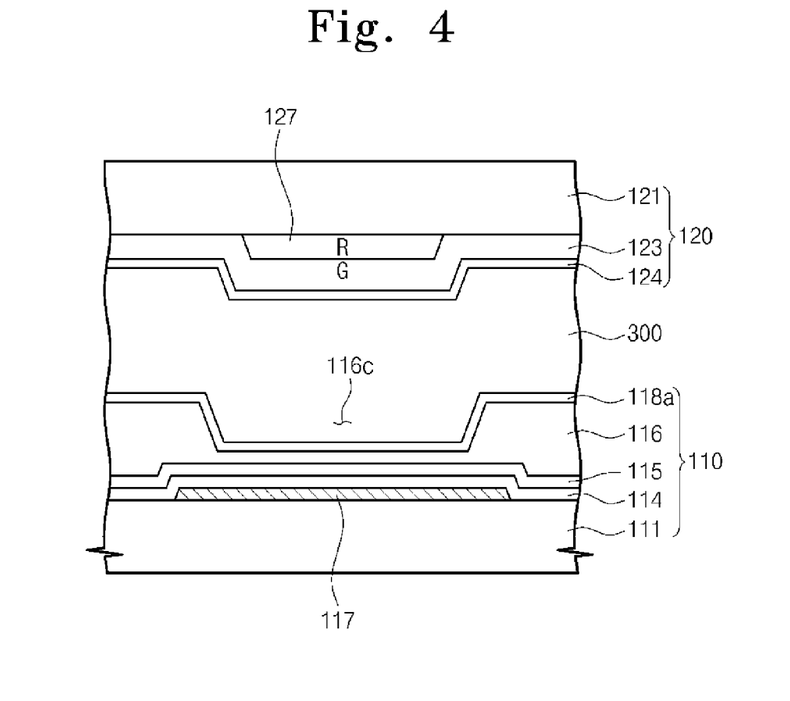
FIG. 4 is a cross-sectional view showing a storage electrode area of a display panel according to another exemplary embodiment of the present invention.
Figure 5:
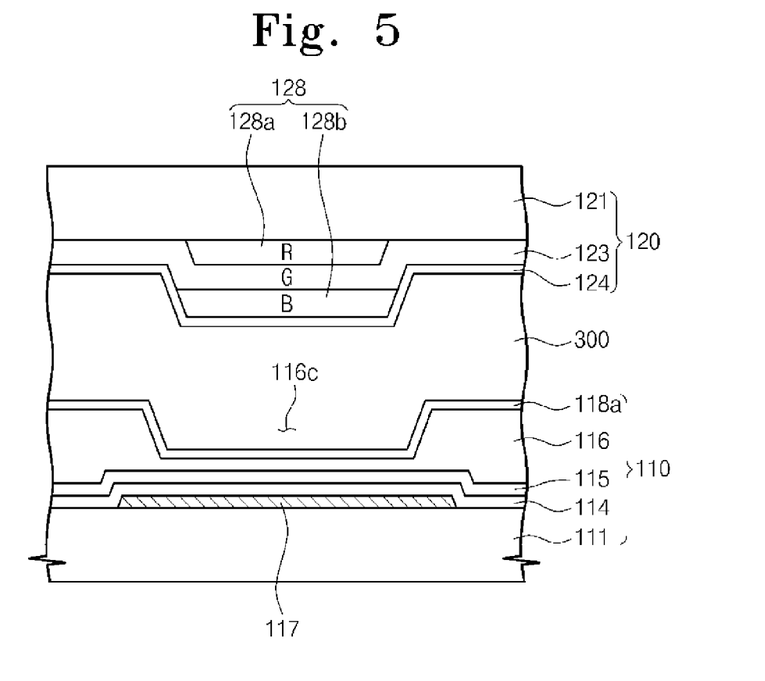
FIG. 5 is a cross-sectional view showing a storage electrode area of a display panel according to another exemplary embodiment of the present invention.

FIG. 4 is a cross-sectional view showing a storage electrode area of a display panel according to another exemplary embodiment of the present invention. FIG. 5 is a cross-sectional view showing a storage electrode area of a display panel according to another exemplary embodiment of the present invention. In FIG. 4 and FIG. 5, the same reference numerals denote the same elements as in FIG. 2, and detailed descriptions of the same elements will be omitted.

Referring to FIG. 4, a color filter substrate 120 includes a third protruding portion 127 arranged at an area corresponding to a concave portion 116c of an organic insulating layer 116, and the third protruding portion 127 serves as a first dummy color filter. A green color filter G is arranged on the color filter substrate 120 to cover the third protruding portion 127.

The first dummy color filter has the same color as that of one color filter of color filters adjacent to the green color filter G and is substantially simultaneously patterned together with the one color filter through one process. In the present exemplary embodiment, the first dummy color filter 127 is a red color filter R.

Referring to FIG. 5, a color filter substrate 120 includes a fourth protruding portion 128 arranged directly above the storage electrode 117, and the fourth protruding portion 128 includes a first dummy color filter 128a and a second dummy color filter 128b. A green color filter G is arranged on the color filter substrate 120 to cover the first dummy color filter 128a, and the second dummy color filter 128b is arranged on the green color filter G.

The first dummy color filter 128a has the same color as that of one selected color filter of color filters adjacent to the green color filter G, and the second dummy color filter 128b has the same color as that of the remaining color filter adjacent to the green color filter G. The first and second dummy color filters 128a and 128b are substantially simultaneously patterned together with the selected one color filter and the remaining color filer, respectively. In the present exemplary embodiment, the first dummy color filter 128a is a red color filter R, and the second dummy color filter 128b is a blue color filter B.

As shown in FIG. 4 and FIG. 5, a thickness of the liquid crystal layer 300 corresponding to the concave portion 116c of the organic insulating layer 116 may be reduced by the third and fourth protruding portions 127 and 128, so that an amount of the liquid crystals at the concave portion 116c may be reduced.

Figure 6:
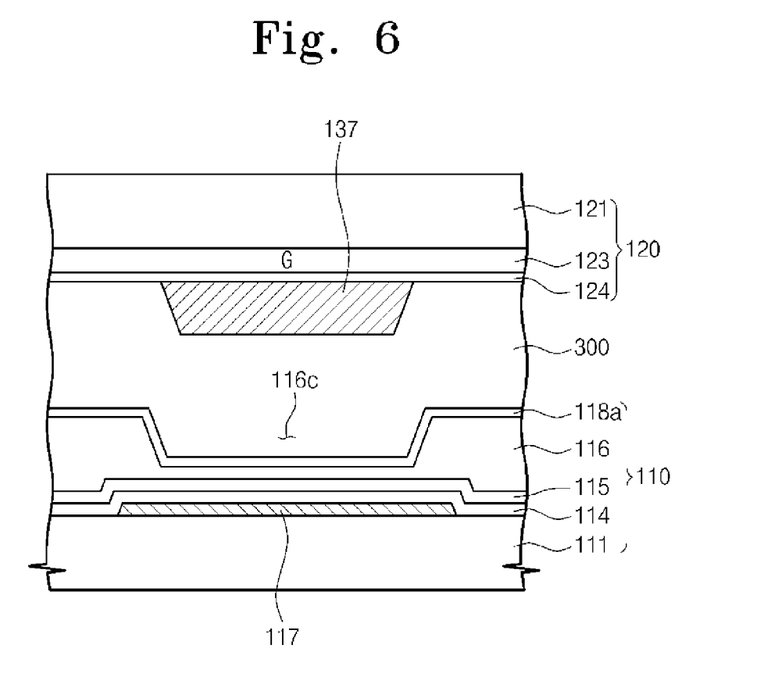
FIG. 6 is a cross-sectional view showing a storage electrode area of a display panel according to another exemplary embodiment of the present invention.

FIG. 6 is a cross-sectional view showing a storage electrode area of a display panel according to another exemplary embodiment of the present invention. In FIG. 6, the same reference numerals denote the same elements as in FIG. 2, and thus detailed descriptions of the same elements will be omitted.

Referring to FIG. 6, a color filter substrate 120 includes a fifth protruding portion 137 arranged thereon at an area corresponding to the storage electrode 117, and the fifth protruding portion 137 serves as a dummy column spacer. The dummy column spacer 137 includes the same material as that of the column spacer 135 shown in FIG. 2 and is substantially simultaneously patterned with the column spacer 135 through one manufacturing process.

The height of the dummy column spacer 137 may be less than that of the column spacer 135. The dummy column spacer 137 may be patterned using a silt slit mask when forming the column spacer 135, so that the dummy column spacer 137 is lower than the column spacer 135. In the present exemplary embodiment, the height of the dummy column spacer 137 may be equal to or less than a depth of a concave portion 116c of the organic insulating layer 116.

As the dummy column spacer 137 is arranged on the color filter substrate 120, a thickness of the liquid crystal layer 300 may be reduced at the concave portion 116c. As a result, an amount of liquid crystal in the concave portion 116c may be decreased.

Figure 7:
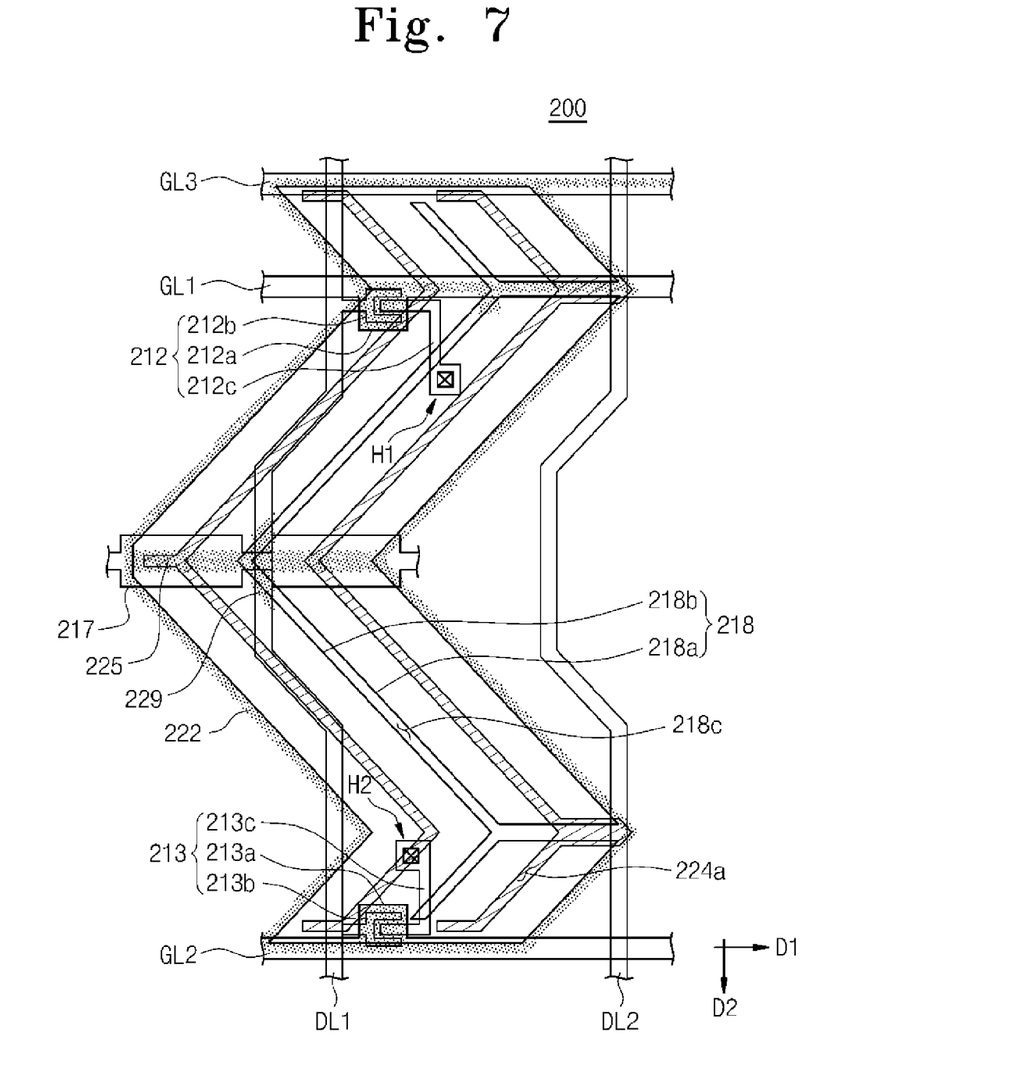
FIG. 7 is a plan view showing a display panel according to another exemplary embodiment of the present invention.

FIG. 7 is a plan view showing a display panel according to another exemplary embodiment of the present invention.

Referring to FIG. 7, a display panel 200 includes a first data line DL1, a second data line DL2, a first gate line GL1, a second gate line GL2, and a third gate line GL3. The first, second, and third gate lines GL1, GL2, and GL3 extend in a first direction D1, and the first and second data lines DL1 and DL2 extend in a second direction D2, which is substantially perpendicular to the first direction D1.

The display panel 200 further includes a first thin film transistor 212, a second thin film transistor 213, a storage electrode 217, and a pixel electrode 218. The first thin film transistor 212 is electrically coupled to the first gate line GL1 and the first data line DL1, and the second thin film transistor 213 is electrically coupled to the second gate line GL2 and the first data line DL1.

The pixel electrode 218 is arranged between the second gate line GL2 and the third gate line GL3, and the storage electrode 217 extends in the first direction D1 between the first gate line GL1 and the third gate line GL3 at a central portion of the pixel. The pixel electrode 218 has a zigzag shape and is symmetrically arranged with respect to the storage electrode 217.

The pixel electrode 218 includes a first sub pixel electrode 218a and a second sub pixel electrode 218b. The first sub pixel electrode 218a has a V-shape rotated in a clockwise direction and is symmetrically arranged with respect to the storage electrode 217. The second sub pixel electrode 218b is arranged in the remaining area of the pixel. The first sub pixel electrode 218a is electrically coupled to the first thin film transistor 212, and the second sub pixel electrode 218b is electrically coupled to the second thin film transistor 213. Also, the first and second sub pixel electrodes 218a and 218b are electrically insulated from each other.

A first opening pattern 218c is formed between the first and second sub pixel electrodes 218a and 218b to insulate the first and second sub pixel electrodes 218a and 218b from each other. The first data line DL1 extends in substantially parallel to the pixel electrode 218 in a predetermined area. As a result, the first data line DL1 partially overlaps with the first opening pattern 218c in the pixel area.

The display panel 200 includes a first black matrix 222 that is arranged in a peripheral portion adjacent to the pixel area to prevent light from leaking through the peripheral portion. The display panel 200 also includes a third black matrix 229 and a fourth black matrix 225. The third black matrix 229 is positioned in an area where the first data line DL1 and the first opening pattern 218c overlap with each other. The fourth black matrix 225 extends substantially parallel to the storage electrode 217 in the first direction D1. The third black matrix 229 prevents light from leaking through the area where the first data line DL1 and the first opening pattern 218c overlap with each other. The fourth black matrix 225 branches from the third black matrix 229 and is arranged directly above the storage electrode 217.

As described in with reference to FIG. 1 and FIG. 2, an organic insulating layer is recessed in a predetermined depth directly above storage electrode 217 to increase a capacitance of a storage capacitor. The fourth black matrix 225 protrudes toward the storage electrode 217 directly above the concaved portion 116c of the organic insulating layer 116. The fourth black matrix 225 may prevent an excessive amount of liquid crystals from accumulating at the concaved portion 116c, so that the total amount of the liquid crystals injected into the display panel 200 may be reduced.

As an example of the present embodiment, the width of the fourth black matrix 225 is equal to or less than that of the storage electrode 217. Also, the fourth black matrix 225 and the first black matrix 222 may have the same thickness. Therefore, the fourth black matrix 225 may reduce the amount of liquid crystals needed for the liquid crystal layer without decreasing an opening ratio of the display panel 200.

FIG. 7 shows the fourth black matrix 225 arranged directly above the storage electrode 217 in the case of a zigzag-shaped pixel electrode 218. However, the display panel 200 may have various protruding portions having different structures as shown in FIG. 3, FIG. 4, FIG. 5, and FIG. 6 arranged in the area corresponding to the storage electrode 217.

FIGS. 8A, 8B, 8C, 8D, 8E, 8F, 8G, 8H, 8I, 8J, and 8K are cross-sectional views showing a method of manufacturing the display panel shown in FIG. 2. As the first thin film transistor 112 and the second thin film transistor 113 may be manufactured through the same process, the manufacturing processes for the first thin film transistor 112 will be described with reference to FIGS. 8A to 8K, and the manufacturing processes for the second thin film transistor 113 will be omitted.

Figure 8A:
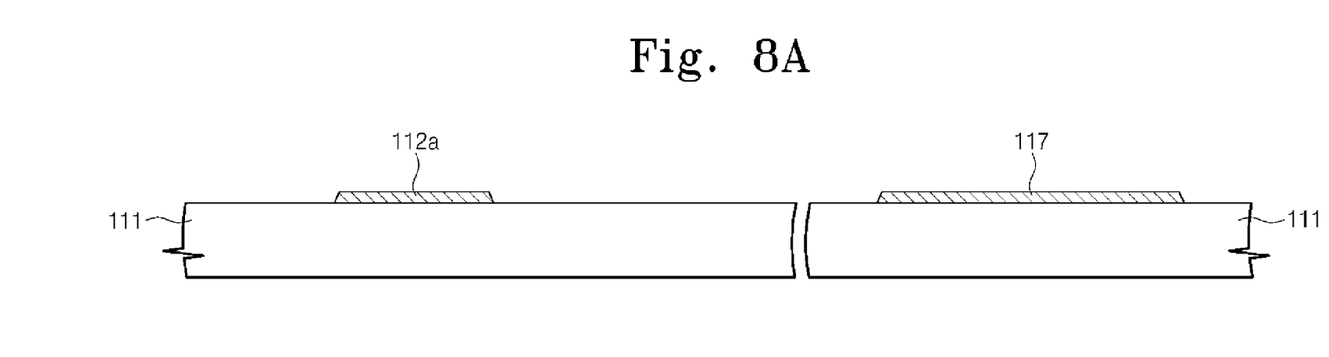

Referring to FIG. 8A, a first gate electrode 112a and a storage electrode 117 may be formed on a first base substrate 111 by coating a gate metal layer over the first base substrate 111 and patterning the gate metal layer using a first mask (not shown). The gate metal layer may include a metallic material such as copper (Cu), aluminum (Al), silver (Ag), chromium (Cr), or a metal alloy. The gate metal layer may be etched through a wet etching process using etchant.

Figure 8B:
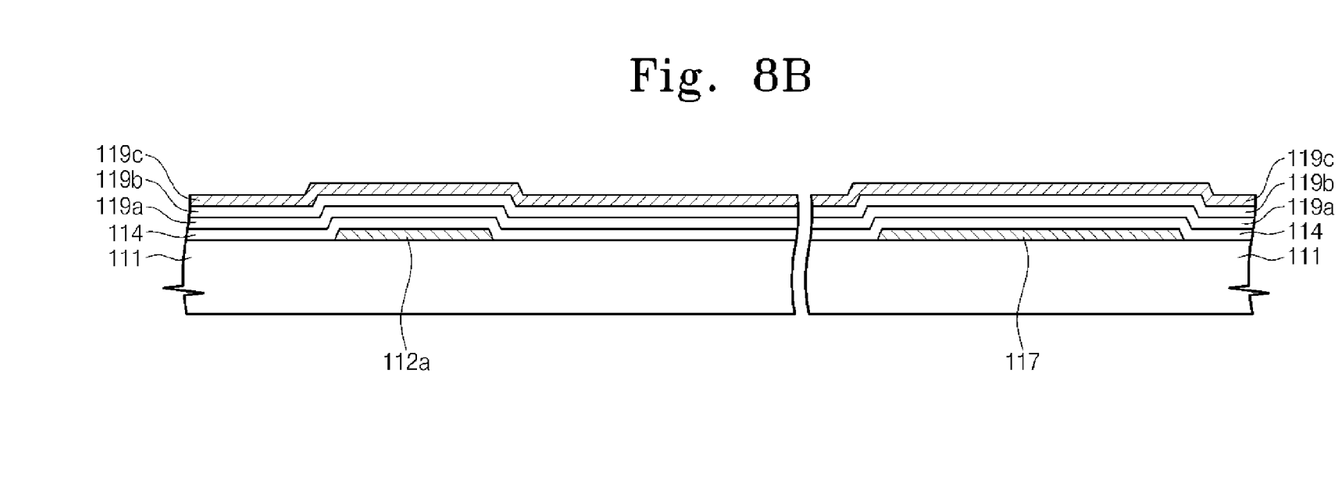

Referring to FIG. 8B, a gate insulating layer 114 is formed on the first base substrate 111 to cover the first gate electrode 112a and the storage electrode 117. The gate insulating layer 114 may include an inorganic compound such as silicon nitride. An active layer 119a, which includes an amorphous silicon layer, is coated on the gate insulating layer 114. An ohmic contact layer 119b, which is doped with impurity ions, is coated on the active layer 119a. The gate insulating layer 114, the active layer 119a, and the ohmic contact layer 119b may be sequentially coated on an entire surface of the first base substrate 111 using a plasma chemical vapor deposition technique.

A data metal layer 119c is coated on the ohmic contact layer 119b. The data metal layer 119c, the ohmic contact layer 119b, and the active layer 119a are patterned through a photolithography process. Although not shown in figures, a first photoresist pattern is formed on the data metal layer 119c. In order to form the first photoresist pattern, a photoresist layer is coated on the data metal layer 119c and exposed to light using a second mask (not shown) before developing the exposed photoresist layer.

The first photoresist pattern has different thicknesses in accordance with positions thereof. The first photoresist pattern is relatively thinner in an area corresponding to the first gate electrode 112a. The second mask may be a slit mask or a halftone mask.

Then, the data metal layer 119c, the ohmic contact layer 119b, and the active layer 119a are sequentially etched through an etching process using the first photoresist pattern as an etching mask. A data metal pattern, a pre-ohmic contact pattern, and an active pattern are formed through the etching process. Here, the data metal pattern, the pre-ohmic contact pattern, and the active pattern have the same structure.

When the first photoresist pattern is uniformly removed, a second photoresist pattern is formed. The data metal pattern and the pre-ohmic contact pattern are removed directly above the first gate metal 112a through an etching process using the second photoresist pattern as an etching mask.

Figure 8C:
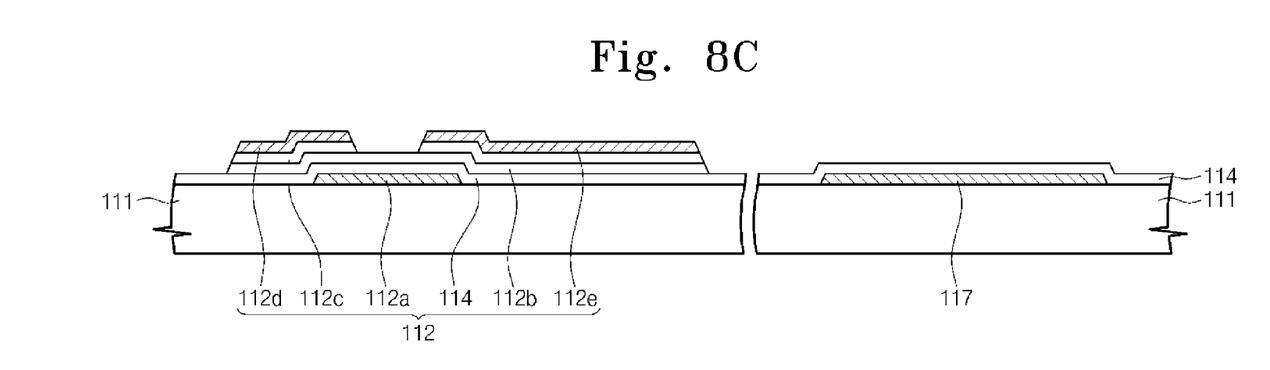

Referring to FIG. 8C, a first source electrode 112d, a first drain electrode 112e, and an ohmic contact pattern 112c are formed above the first gate electrode 112a through the etching process. The ohmic contact pattern 112c is divided into two portions that are coupled to the first source electrode 112d and the first drain electrode 112e, respectively. The active pattern 112b is formed under the ohmic contact pattern 112c.

The first thin film transistor 112 is completed through the above-described processes. According to the above, the active pattern 112b, the ohmic contact pattern 112c, the first source electrode 112d, and the first drain electrode 112e are patterned using one mask, thereby simplifying the manufacturing process and reducing the manufacturing cost of a display panel.

Figure 8D:
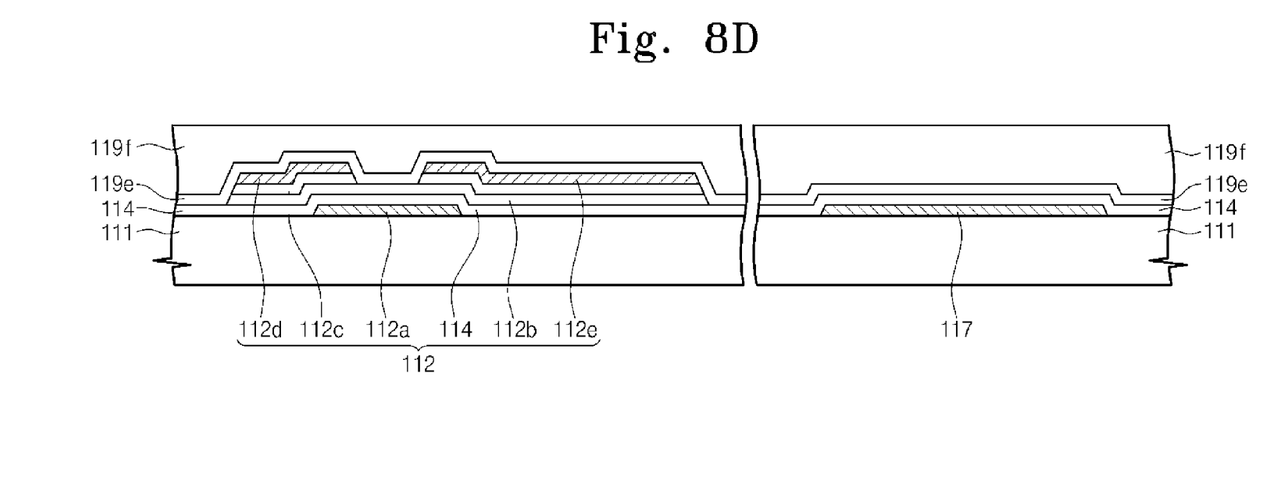

Referring to FIG. 8D, a first transparent insulating layer 119e and a second transparent insulating layer 119f are sequentially coated on the first thin film transistor 112 and the gate insulating layer 114. The second transparent insulating layer 119f includes a photosensitive acrylic resin so that the second transparent insulating layer 119f may be patterned through the photolithography process. The second transparent insulating layer 119f may have a negative type photoresist or a positive type photoresist. In the present exemplary embodiment, the second transparent insulating layer 119f including the positive type photoresist will be described as an example.

Figure 8E:
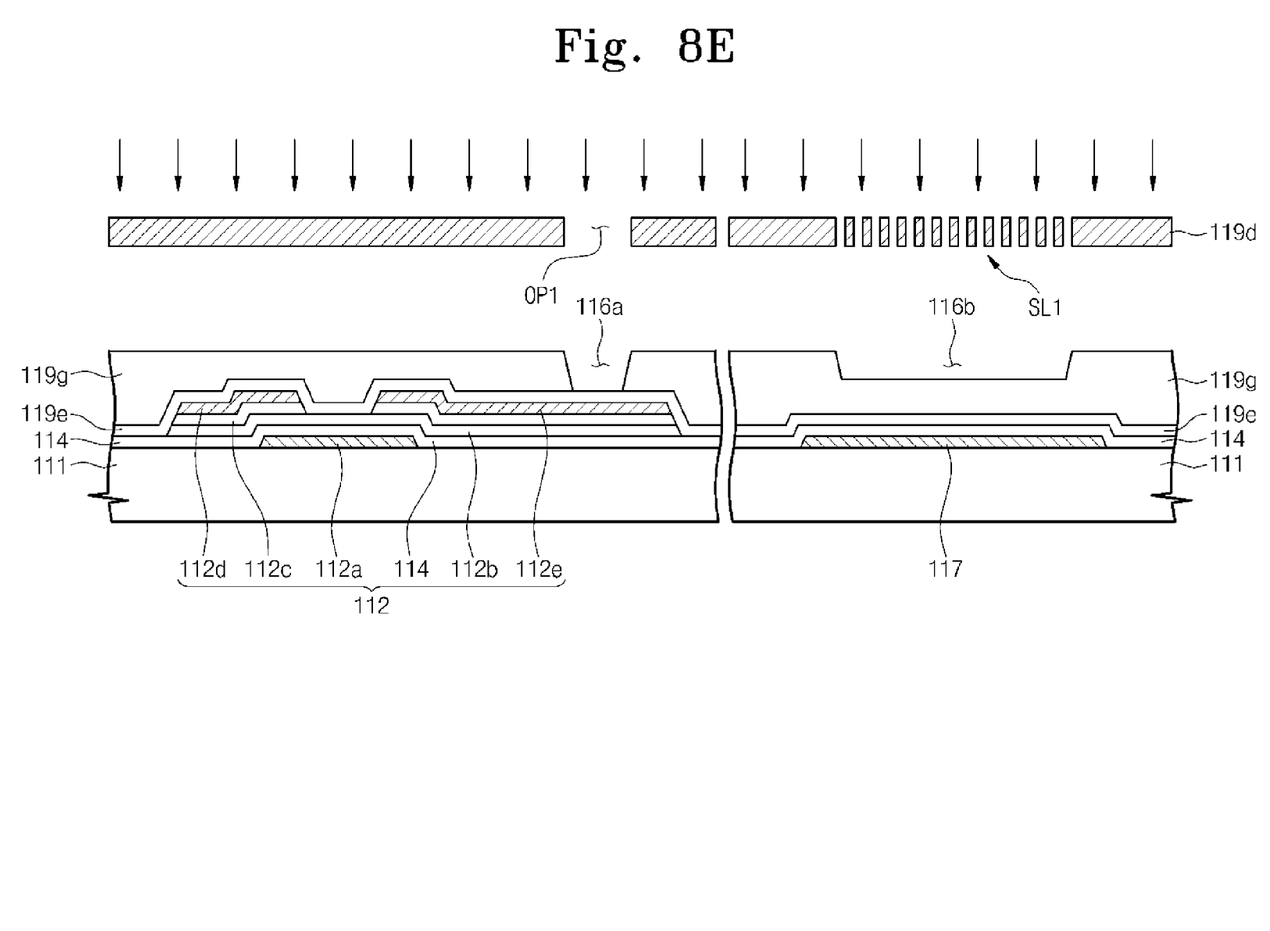

Referring to FIG. 8E, the second transparent insulating layer 119f is exposed using a third mask 119d. The third mask 119d includes a transmissive portion OP1, a slit transmissive portion SL1, and a light blocking portion. The third mask 119d may include a slit mask.

The second transparent insulating layer 119f is completely removed from an area corresponding to the transmissive portion OP1 and partially removed from an area corresponding to the slit transmissive portion SL1, thereby forming an organic insulating pattern 119g that has a first opening portion 116a corresponding to the transmissive portion OP1 and a first groove 116b corresponding to the slit transmissive portion SL1. The first groove 116b is formed directly above the storage electrode 117.

Then, the first transparent insulating layer 119e is etched using the organic insulating pattern 119g as an etching mask.

Figure 8F:
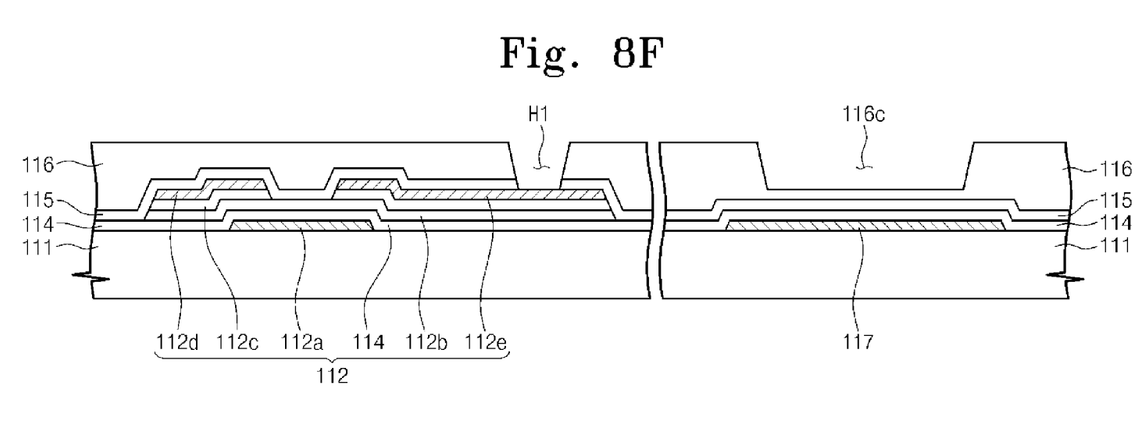

Referring to FIG. 8F, the first transparent insulating layer 119e is removed in an area corresponding to the first opening portion 116a through the etching process, thereby forming a passivation layer 115 having a first contact hole H1. The first drain electrode 112e of the first thin film transistor 112 is exposed through the first contact hole H1.

Also, the organic insulating pattern 119g is uniformly removed in a predetermined thickness, thereby forming an organic insulating layer 116. The organic insulating pattern 119g may be completely or partially removed at a position corresponding to the first groove 116b. As shown in FIG. 8F, the organic insulating layer 116 is partially removed at the position, so that the organic insulating layer 116 has a concave portion 116c concaved toward the storage electrode 117.

Figure 8G:
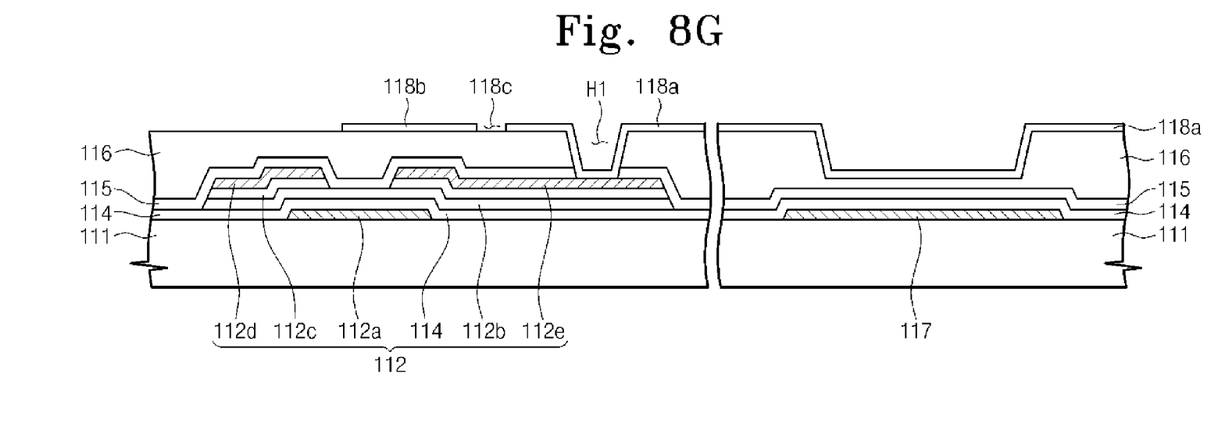

Referring to FIG. 8G, a transparent conductive layer (not shown) is formed on the organic insulating layer 116 and patterned by an etching process using a fourth mask (not shown), thereby forming a first sub pixel electrode 118a and a second sub pixel electrode 118b on the organic insulating layer 116. The first and second sub pixel electrodes 118a and 118b are insulated from each other by a first opening pattern 118c.

The first sub pixel electrode 118a is electrically coupled to the first drain electrode 112e of the first thin film transistor 112 via the first contact hole H1. Also, the first sub pixel electrode 118a faces the storage electrode 117. The organic insulating layer 116, the passivation layer 115, and the gate insulating layer 114 are interposed between the first sub pixel electrode 118a and the storage electrode 117 and serve as a dielectric substance of the storage capacitor.

The array substrate 110 (shown in FIG. 2) is completed through the above-described processes, and the color filter substrate 120 (shown in FIG. 2) is manufactured through the below processes.

Figure 8H:
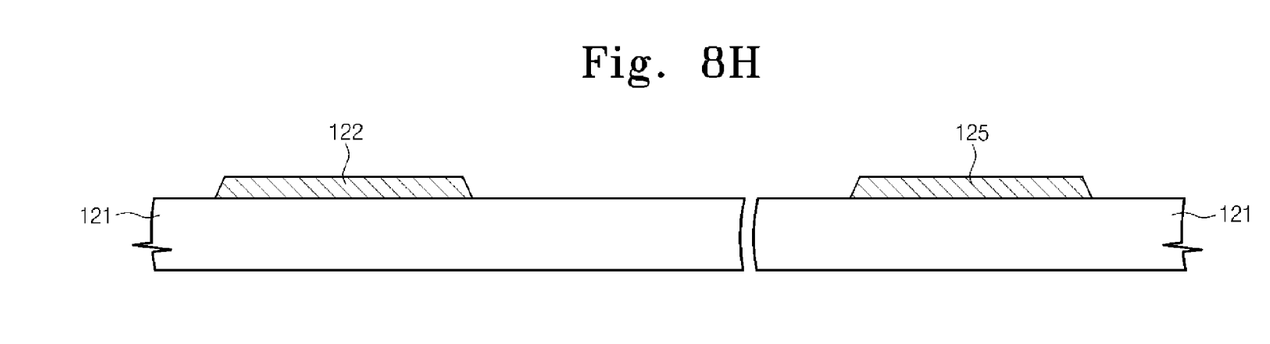

Referring to FIG. 8H, a first black matrix 122 and a second black matrix 125 are formed on a second base substrate 121 by forming and patterning a light blocking layer (not shown) that includes chromium (Cr) or organic material. The first black matrix 122 is formed in an area corresponding to the first thin film transistor 112 and the first data line DL1, and the second black matrix 125 is formed in an area corresponding to the storage electrode 117.

Figure 8I:
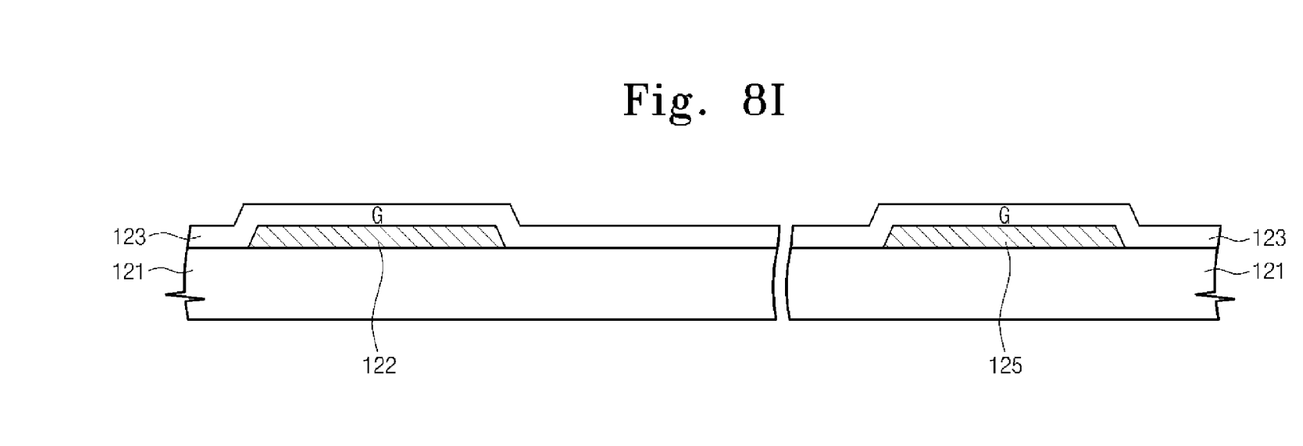

Referring to FIG. 8I, a color filter layer 123 is formed over the second base substrate 121 to cover the first and second black matrices 122 and 125. The color filter layer 123 partially overlaps with the first black matrix 122 formed in a peripheral portion of the pixel area, but the color filter layer 123 covers an entire surface of the second black matrix 125 formed in the pixel area. The color filter layer 123 includes a red color filter, a green color filter, and a blue color filter. The red, green, and blue color filters may be sequentially formed through a patterning process or an inkjet printing method.

Figure 8J:
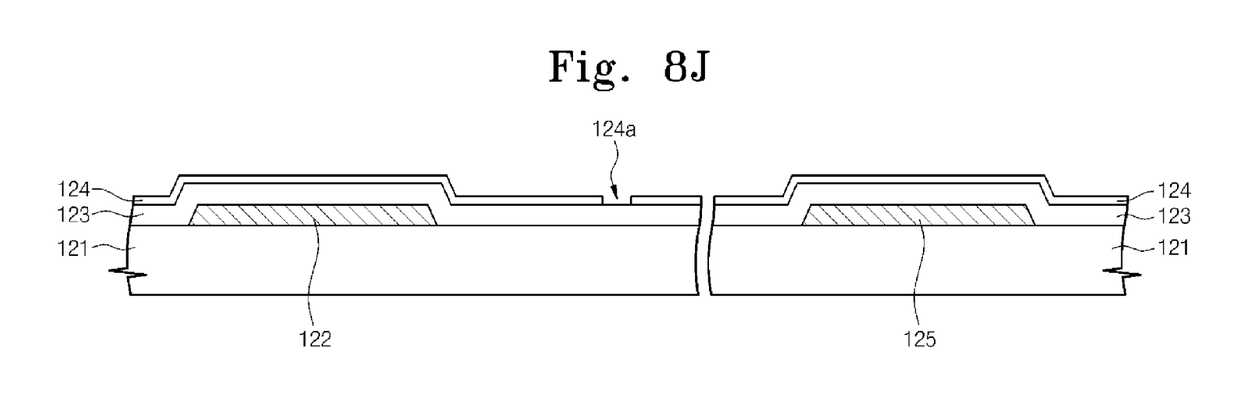

Referring to FIG. 8J, a transparent conductive layer (not shown) is formed on the color filter layer 123 and patterned, thereby forming a common electrode 124 on the color filter layer 123. A second opening pattern 124a is formed through the common electrode 124 through the above-described patterning process.

Figure 8K:
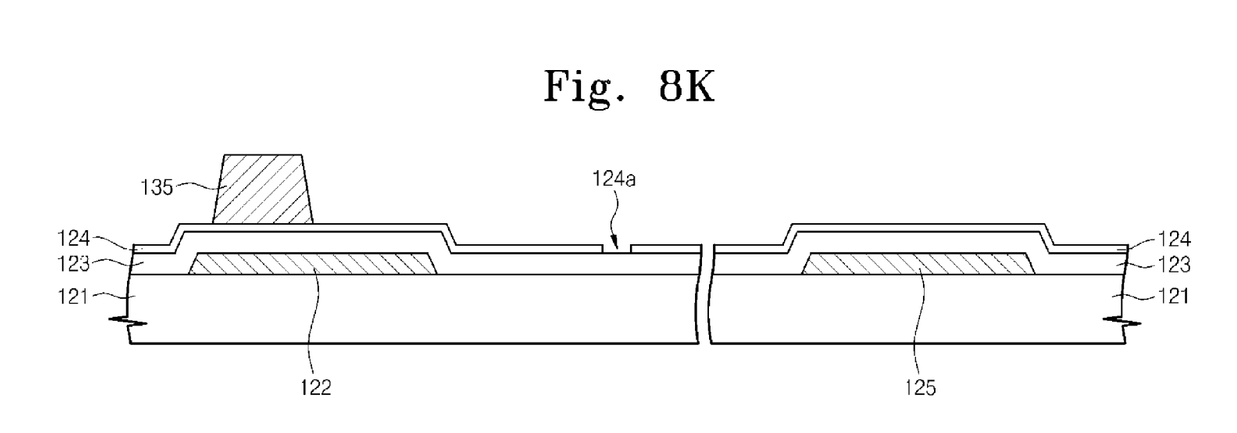

Referring to FIG. 8K, an insulating layer (not shown) that has the same thickness as a predetermined cell-gap is deposited on the common electrode 124. The insulating layer is patterned to form a column spacer 135 on the common electrode 124. As FIG. 8K shows, the column spacer 135 is formed above the first black matrix 122. Therefore, the column spacer 135 may maintain the cell-gap of the display panel 100 (shown in FIG. 1) without reducing an opening ratio of the display panel 100.

The color filter substrate 120 completed through the above-described processes is combined with the array substrate 110. The liquid crystals may be dropped on the color filter substrate 120 before the color filter substrate 120 and the array substrate 110 are assembled with each other. Thus, the amount of the liquid crystals at the concave portion 116c may be reduced due to the second black matrix 125, thereby reducing the total amount of the liquid crystals dropped on the color filter substrate 120.

As another example of the present embodiment, the liquid crystals may be injected between the array substrate 110 and the color filter substrate 120 after assembling the array substrate 110 with the color filter substrate 120. The second black matrix 125 reduces a distance between the array substrate 110 and the color filter substrate 120, so that an amount of the liquid crystals may be reduced at the concave portion 116c.

As described above, the organic insulating layer formed on the array substrate has the concave portion directly above the storage electrode, and the protruding portion formed on the color filter substrate protrudes toward the concave portion.

Thus, the amount of the liquid crystals at the concave portion may be reduced, so that the total amount of liquid crystal needed for the display panel may be also reduced. Further, the display panel may have a uniform cell-gap due to the protruding portion formed corresponding to the concave portion.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display panel, comprising:
   an array substrate comprising:
   a first base substrate comprising a plurality of pixel areas;
   a storage electrode arranged in each pixel area of the first base substrate;
   an insulating layer arranged on the first base substrate to cover the storage electrode, the insulating layer comprising a concave portion directly above the storage electrode; and a pixel electrode arranged on the insulating layer and extended in the concave portion to face the storage electrode;

an opposite substrate comprising:
  a second base substrate facing the first base substrate; and
  a protruding portion arranged on the second base substrate at a position corresponding to the storage electrode, overlapped with the pixel electrode, and protruded toward the first base substrate; and a liquid crystal layer interposed between the array substrate and the opposite substrate.

2. The display panel of claim 1, wherein the opposite substrate further comprises a first black matrix arranged on the second base substrate at a position corresponding to a peripheral area adjacent to the pixel areas.

3. The display panel of claim 2, wherein the protruding portion comprises a second black matrix, the second black matrix comprising the same material as that of the first black matrix.

4. The display panel of claim 3, wherein the opposite substrate further comprises a color filter layer comprising color filters corresponding to the pixel areas, respectively, and the color filters cover the second black matrix.

5. The display panel of claim 4, wherein the protruding portion further comprises a dummy color filter arranged between the second black matrix and one color filter among the color filters arranged above the second black matrix, the dummy color filter having the same color as that of at least one color filter of the color filters that are adjacent to the one color filter.

6. The display panel of claim 1, wherein the opposite substrate further comprises a color filter layer comprising color filters corresponding to the pixel areas, respectively.

7. The display panel of claim 6, wherein the protruding portion comprises a first dummy color filter arranged between a corresponding color filter among the color filters and the second base substrate, and the first dummy color filter has the same color as that of one of the color filters that are adjacent to the corresponding color filter.

8. The display panel of claim 7, wherein the protruding portion further comprises a second dummy color filter arranged on the corresponding color filter, the second dummy color filter having the same color as that of one color filter of the adjacent color filters and different from that of the first dummy color filter.

9. The display panel of claim 6, wherein the opposite substrate further comprises:
  a common electrode arranged on the color filter layer; and
  a gap maintaining pattern arranged between the array substrate and the opposite substrate to maintain a gap between the array substrate and the opposite substrate.

10. The display panel of claim 9, wherein the protruding portion comprises a dummy gap maintaining pattern arranged on the common electrode, the dummy gap maintaining pattern comprising the same material as that of the gap maintaining pattern.

11. The display panel of claim 1, wherein a height of the protruding portion is equal to or less than a depth of the concave portion of the insulating layer.

12. The display panel of claim 1, wherein the insulating layer comprises:
  a gate insulating layer covering the storage electrode;
  a passivation layer arranged on the gate insulating layer; and
  an organic insulating layer arranged on the passivation layer, the organic insulating layer comprising the concave portion.

13. The display panel of claim 1, wherein the pixel electrode comprises:
  a first sub pixel electrode to receive a first pixel voltage; and
  a second sub pixel electrode to receive a second pixel voltage, the second pixel voltage being smaller than the first pixel voltage.

14. The display panel of claim 13, wherein the pixel electrode comprises a plurality of first openings formed therethrough to electrically separate the first sub pixel electrode and the second sub pixel electrode from each other and to divide each pixel area into a plurality of domains.

15. The display panel of claim 14, wherein the opposite substrate further comprises a common electrode facing the pixel electrode, the common electrode comprising a plurality of second openings formed therethrough, the second openings being arranged in different positions from those of the first openings to divide the domains.

16. The display panel of claim 13, wherein the array substrate further comprises:
  a first gate line;
  a second gate line spaced apart from the first gate line;
  a data line crossing with and electrically insulated from the first gate line and the second gate line;
  a first thin film transistor electrically coupled to the first gate line and the data line to output the first pixel voltage; and
  a second thin film transistor electrically coupled to the second gate line and the data line to output the second pixel voltage.

17. The display panel of claim 16, wherein the first sub pixel electrode is electrically coupled to an output electrode of the first thin film transistor to receive the first pixel voltage, and the second sub pixel electrode is electrically coupled to an output electrode of the second thin film transistor to receive the second pixel voltage.

18. A method of manufacturing a display panel, comprising:
  forming a gate electrode and a storage electrode in a pixel area of a first base substrate;
  forming a gate insulating layer on the first base substrate to cover the gate electrode and the storage electrode;
  forming an active pattern, an ohmic contact pattern, a source electrode, and a drain electrode on the gate insulating layer, the source electrode and the drain electrode having the same shape as that of the ohmic contact pattern;
  forming an insulating layer to cover the source electrode and the drain electrode and comprising a concave portion directly above the storage electrode;
  forming a pixel electrode on the insulating layer;
  forming a protruding portion on a second base substrate;
  coupling the first base substrate and the second base substrates to each other such that the second base substrate faces the first base substrate with the protruding portion protruding toward the storage electrode; and
  interposing a liquid crystal layer between the first base substrate and the second base substrate.

19. The method of claim 18, wherein forming the protruding portion comprises:
  coating a light blocking layer on the second base substrate; and
  patterning the light blocking layer to form a first black matrix in an area corresponding to a peripheral area of the pixel area and a second black matrix in an area corresponding to the storage electrode.

20. The method of claim 19, further comprising forming a first color filter among color filters having different colors from each other on the second base substrate, and wherein forming the protruding portion further comprises forming a second color filter among the color filters on the first color filter, the second color filter having a different color from that of the first color filter and being formed at a position corresponding to the storage electrode.

21. The method of claim 20, further comprising forming a common electrode on the color filter and the protruding portion.

* * * * *